US012107828B2

United States Patent
Hofmann et al.

(10) Patent No.: US 12,107,828 B2
(45) Date of Patent: Oct. 1, 2024

(54) CONDITIONAL EGRESS IP FOR DELIVERY OF LOCALIZED CONTENT

(71) Applicant: Netskope, Inc., Santa Clara, CA (US)

(72) Inventors: Jason Hofmann, New York, NY (US); Jason Eggleston, Newport Beach, CA (US); Piyush Patel, San Jose, CA (US); Lonhyn T. Jasinskyj, Portola Valley, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/530,052

(22) Filed: Dec. 5, 2023

(65) Prior Publication Data

US 2024/0187377 A1  Jun. 6, 2024

Related U.S. Application Data

(60) Provisional application No. 63/430,295, filed on Dec. 5, 2022, provisional application No. 63/430,294, filed on Dec. 5, 2022.

(51) Int. Cl.
*H04L 9/40* (2022.01)
(52) U.S. Cl.
CPC ........ *H04L 63/0236* (2013.01); *H04L 63/107* (2013.01); *H04L 63/20* (2013.01)
(58) Field of Classification Search
CPC .... H04L 63/0236; H04L 63/107; H04L 63/20
USPC .......................................................... 726/1
See application file for complete search history.

(56) References Cited

U.S. PATENT DOCUMENTS

| 8,938,777 | B1 | 1/2015 | Bharali et al. |
| 2006/0268902 | A1 | 11/2006 | Bonner |
| 2009/0303943 | A1 | 12/2009 | Vikberg et al. |
| 2013/0005299 | A1* | 1/2013 | Raleigh ................. G06Q 30/04 455/406 |
| 2016/0006765 | A1* | 1/2016 | Shem Tov .............. H04L 63/08 726/1 |
| 2019/0109815 | A1 | 4/2019 | Nandan et al. |

OTHER PUBLICATIONS

Traboulsi, Wireless Load Self-Disconnection Module for Automatic Power Supply System, International Journal of Scientific & Technology Research, Aug. 2012, pp. 62-65, vol. 1, Issue 7.

\* cited by examiner

*Primary Examiner* — Anthony D Brown
(74) *Attorney, Agent, or Firm* — MUGHAL GAUDRY & FRANKLIN PC

(57) ABSTRACT

A cloud network for delivering local content to a user at a user location. The cloud network includes a client device comprising a local application, a mid-link server and a cloud provider. The mid-link server receives from the client device a request for local data from the user at the user location. The user has provided the request for the local data from the user location without a data center. A sub-data center for the user location is identified and assigned an Internet Protocol (IP) address for the user location. The sub-data center is a data center nearest to the user location. Each data center has IP addresses for different locations to deliver the local content to the respective IP address for the location. The request is routed to the sub-data center which is used to provide the local data to the user by the cloud provider.

20 Claims, 11 Drawing Sheets

CONDITIONAL EGRESS IP FOR DELIVERY OF LOCALIZED CONTENT

PRIORITY

The present application is a Non-Provisional of U.S. Provisional Application Nos. U.S. 63/430,294 and 63/430,295, both filed Dec. 5, 2022, which are incorporated by reference for all purposes.

BACKGROUND

This disclosure relates in general to Internet Protocol (IP) address assignment systems and, although not by way of limitation, to policy-based IP address assignment to egressing users among other things.

Generally, enterprises have a single IP address for multiple users. If a single user commits an abusive activity or if any one of those endpoints is compromised, the complete IP address is sometimes blacklisted which penalizes all the users associated with the single IP address. Currently, there are a number of abuse mitigation, bot mitigation, and Distributed Denial of Service (DDoS) mitigation technologies for traffic coming from a single IP address. However, identifying a single user from the multiple users who committed the malicious activity is difficult.

Generally, while providing localized content on an IP address to multiple users across the world, there are a few locations where the data centers are not present. These locations lack the functionality of getting customized content. However, delivery of localized content in this situation is hard although indispensable for customer satisfaction and engagement.

SUMMARY

In one embodiment, the present disclosure provides a cloud network for delivering local content to a user at a user location. The cloud network includes a client device comprising a local application, a mid-link server and a cloud provider. The mid-link server receives from the client device a request for local data from the user at the user location. The user has provided the request for the local data from the user location without a data center. A sub-data center for the user location is identified and assigned an Internet Protocol (IP) address for the user location. The sub-data center is a data center nearest to the user location. Each data center has IP addresses for different locations to deliver the local content to the respective IP address for the location. The request is routed to the sub-data center which is used to provide the local data to the user by the cloud provider.

In an embodiment, a cloud network for delivering local content to a user of a plurality of users at a user location. The cloud network includes a client device, a mid-link server, and a cloud provider. The client device includes a local application, and the local application runs on the client device. The mid-link server is configured to receive from the local application on the client device a request for local data from the user at the user location from a plurality of locations. A set of locations from the plurality of locations is identified without data centers. The user has provided the request for the local data from the user location without a data center, and the user location is from the set of locations. A sub-data center for the user location from a plurality of data centers is identified. The sub-data center is assigned an Internet Protocol (IP) address for the user location and the sub-data center is a data center nearest to the user location which is assigned the IP address for the user location. The request is routed to the sub-data center. Each data center of the plurality of data centers has IP addresses for different locations to deliver the local content on the respective IP address for the location and the user is provided at the user location. The local data using the IP address of the sub-data center and the cloud provider configured to provide the local data to the user based on the request for the local data from the user.

In another embodiment, a localized content providing method in a cloud-based multi-tenant system for delivering local content to a plurality of users at a specific location. In one step, a local application on a client device is received. A request for local data from a user of the plurality of users at a user location from a plurality of locations. A mid-link server identifies a set of locations from the plurality of locations without data centers. The user has provided the request for the local data from the user location without a data center, and the user location is from the set of locations. A sub-data center is identified for the user location from a plurality of data centers. The sub-data center is assigned an Internet Protocol (IP) address for the user location, and the sub-data center is a data center nearest to the user location which is assigned the IP address for the user location. The request to the sub-data center is routed. Each data center of the plurality of data centers has IP addresses for different locations to deliver the local content on the respective IP address for the location. The user at the user location is provided the local data using the IP address of the sub-data center.

In yet another embodiment, a localized content providing method in a cloud-based multi-tenant system for delivering local content to a plurality of users at a specific location, the localized content providing method for delivering content, collectively having code for:

receiving from a local application on a client device, a request for local data from a user of the plurality of users at a user location from a plurality of locations;

identifying by a mid-link server, a set of locations from the plurality of locations without data centers, wherein the user has provided the request for the local data from the user location without a data center, and the user location is from the set of locations;

identifying a sub-data center for the user location from a plurality of data centers, wherein the sub-data center is assigned an Internet Protocol (IP) address for the user location, and the sub-data center is a data center nearest to the user location which is assigned the IP address for the user location;

routing the request to the sub-data center, wherein each data center of the plurality of data centers have IP addresses for different locations to deliver the local content on the respective IP address for the location; and providing the user at the user location, the local data using the IP address of the sub-data center.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
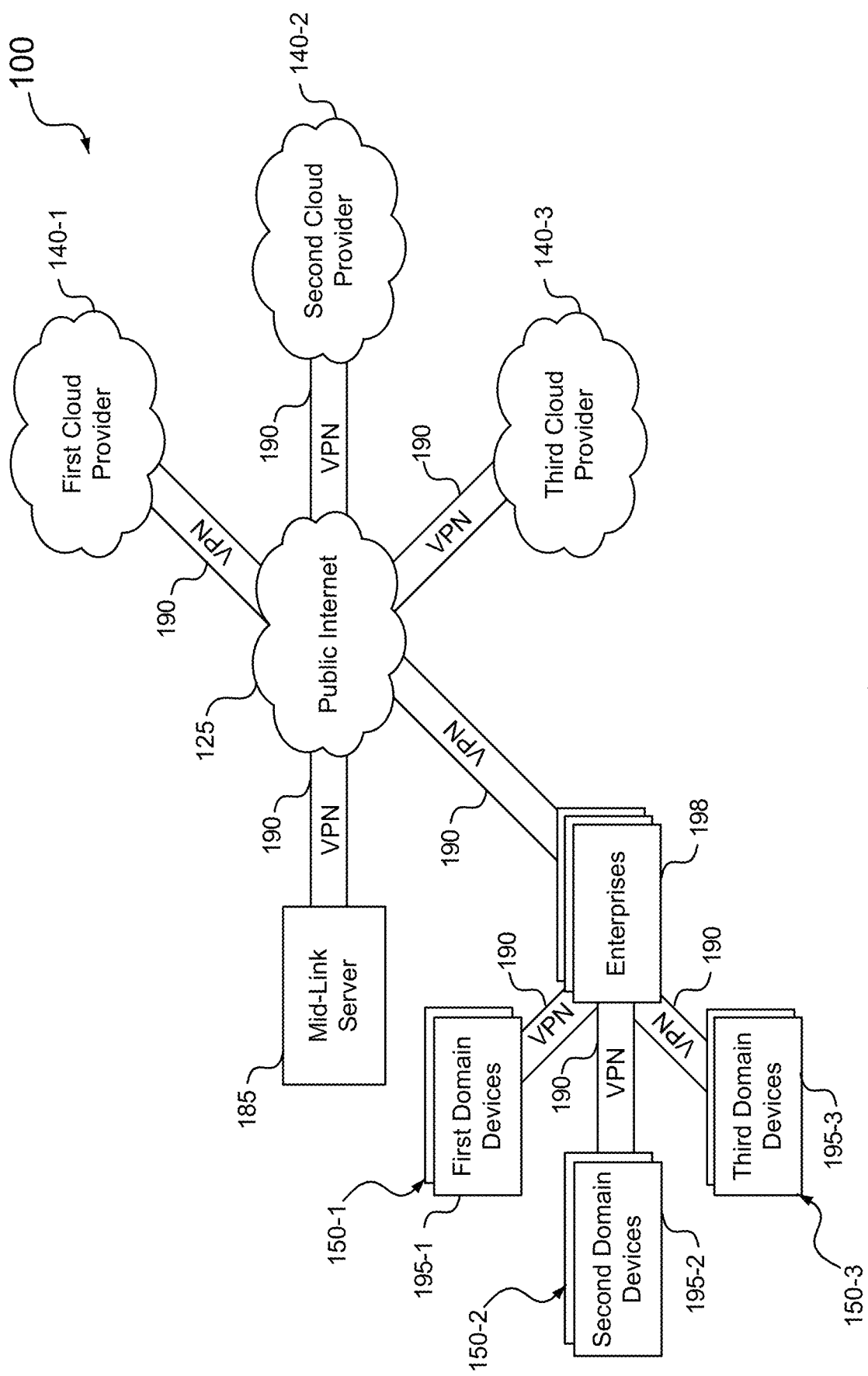
FIG. 1 depicts a block diagram of an embodiment of a cloud network allowing multiple tenants in different domains to communicate with various cloud providers over a public internet.

Referring first to FIG. 1, a block diagram of an embodiment of a cloud network 100 allowing multiple tenants in different domains to communicate with various cloud providers over a public internet 125 is shown. The cloud network 100 allows multiple tenants or enterprises to all use the same network separated by domain or some other logical separation. Encryption, leased/encrypted tunnels, firewalls, and/or gateways can be used to keep the data from one enterprise 198 separate from other enterprises 198. Each client device(s) 195 can communicate with the cloud provider(s) 140 of services and storage using the public internet 125. A mid-link server 185 provides multi-tenancy control, policies, and routing for each domain. The cloud network 100 can be also referred to as a policy-based Internet Protocol (IP) address allocation system 100 or a cloud-based multi-tenant system 100. The policy-based Internet Protocol (IP) address allocation system 100 assigns unique IP addresses to each user of a plurality of users in a cloud-based network and includes a plurality of servers, collectively having code for performing the functions of the policy-based Internet Protocol (IP) address allocation system 100.

The cloud network 100 may include a first computing environment 150-1 having client device(s) 195-1 for a first domain, a second computing environment 150-2 having client device(s) 195-2 for a second domain, and a third computing environment 150-3 having client device(s) 195-3 for a third domain. Each domain communicates with its respective enterprise 198 using a virtual private network (VPN) 190 over local area networks (LANs), wide area networks (WANs), and/or the public Internet 125. In place of a VPN 190 as an end-to-end path, tunneling (e.g., IP-in-IP, GRE), policy-based routing (PBR), BGP/IGP route injection, or proxies could be used. The first cloud provider 140-1, the second cloud provider 140-2, and the third cloud provider 140-3 may be public or private clouds. Some examples of cloud provider(s) 140 include Amazon Web Services (AWS)®, Google Cloud Platform (GCP)®, and Microsoft Azure®. Some or all of the cloud provider(s) 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud provider(s) 140 are shown, any suitable number of cloud provider(s) 140 may be provided with some captive to a particular enterprise or otherwise not accessible to multiple domains.

Each of the cloud provider(s) 140 may communicate with the public Internet 125 using a secure connection. For example, the first cloud provider 140-1 may communicate with the public Internet 125 via a virtual private network (VPN) 190, the second cloud provider 140-2 may communicate with the public Internet 125 via a different VPN 190, and the third cloud provider 140-3 may communicate with the public Internet 125 via yet another VPN 190. Some embodiments could use leased connections or physically separated connections to segregate traffic. Although one VPN 190 is shown, it is to be understood that there are many VPNs to support different client devices, tenants, domains, etc.

A plurality of enterprises 198 may also communicate with the public Internet 125 and the client device(s) 195 for their domain via VPNs 190. Some examples of enterprises 198 may include corporations, educational facilities, governmental entities, and private consumers. Each enterprise may support one or more domains to logically separate its networks. The client device(s) 195 for each domain may include individual computers, tablets, servers, handhelds, and network infrastructure that are authorized to use the computing resources of their respective enterprise 198.

Further, the mid-link server 185 (or an access resource server (ARS)) may communicate with the public Internet 125 via a VPN 190. The mid-link server 185 also provides cloud access security broker (CASB) functionality for cloud security to enterprises 198 with data flows of the CASB being regulated with a global cloud traffic controller (GCTC). Communication between the mid-link server 185 and the cloud provider(s) 140 for a given enterprise 198 can be either a VPN connection or a tunnel depending on the preference of the enterprise 198. The mid-link server 185 may configure, test, and enforce policies and routing across the cloud network 100. For example, the mid-link server 185 may ensure that the policies are consistent across the cloud provider(s) 140, enterprises 198, and computing environments 150. The mid-link server 185 provides proxies to the cloud providers 140 and may apply various policies. The mid-link server 185 assigns unique IP addresses to users egressing the cloud network 100. The connection between the client device(s) 195 and the mid-link server 185 is over an encrypted VPN or tunnel. The IP address is an IPV6 address or an IPV4 address or any type of IP address.

Figure 2:
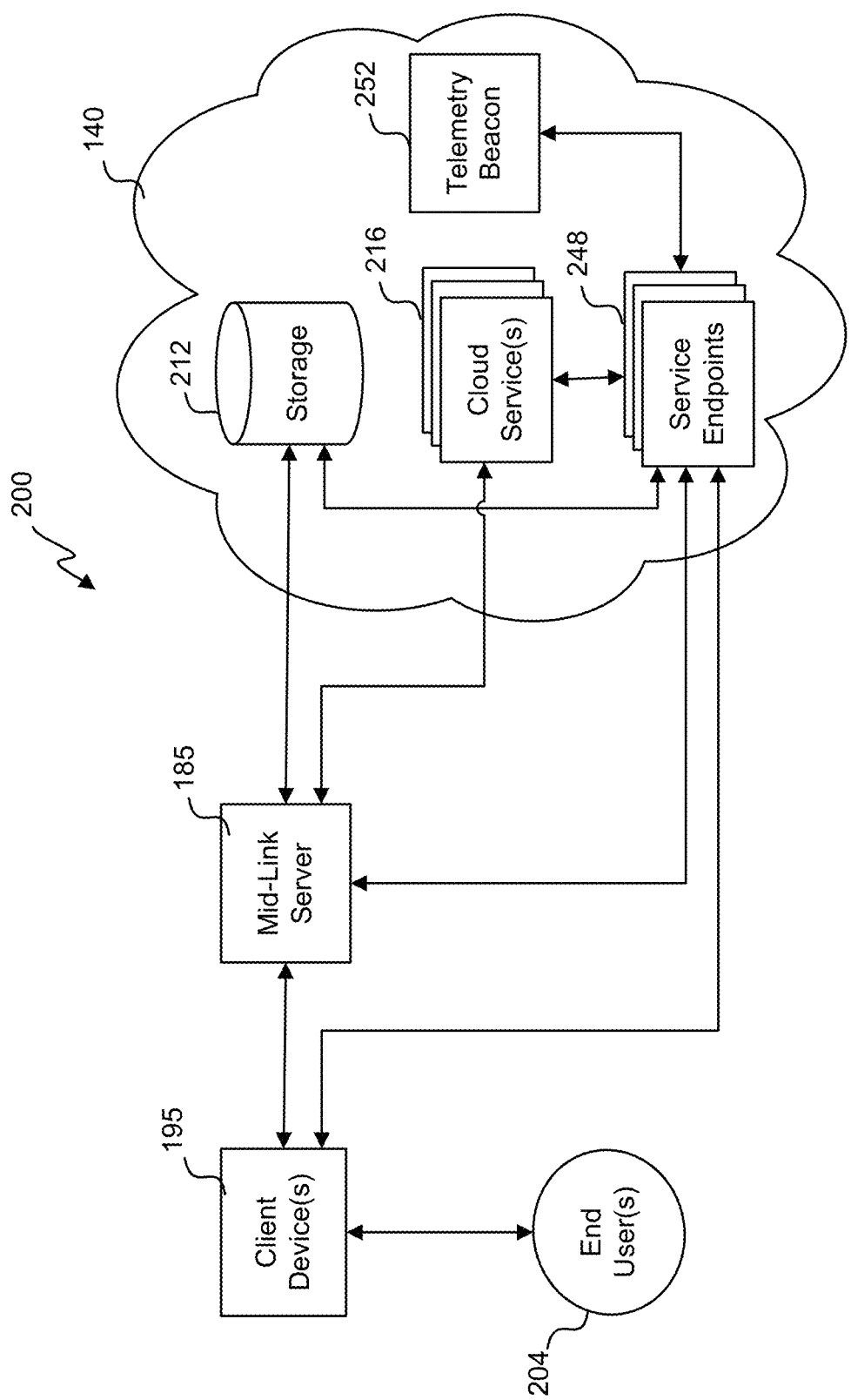
FIG. 2 depicts a block diagram of an embodiment of a single-tenant cloud network where a client device communicates with a cloud provider.

With reference to FIG. 2, a block diagram of an embodiment of a single-tenant cloud network 200 where the client device(s) 195 communicates with the cloud provider(s) 140 is shown. The client device(s) 195 is operated by an end user(s) 204. The cloud provider(s) 140 is accessible directly or through the mid-link server 185 depending on the route chosen, services, policies, etc. Included in the cloud provider(s) 140 are services 216 such as storage 212 that enable applications and functionality on the client device(s) 195.

Service endpoints 248 are provided in the cloud provider(s) 140 to enable communication with the mid-link server 185 and the client device(s) 195. The service endpoints 248 may include VPN terminations and proxies that provide for a secure tunnel with the mid-link server 185 and/or the client device(s) 195. The mid-link server 185 can optionally connect directly with the services 216 and the storage 212 of the cloud provider(s) 140 without using the service endpoints 248. In some cases, the client device(s) 195 communicates with the services 216 and the storage 212 through the mid-link server 185 depending on route preference and policies.

When the services 216, the storage 212, or other functionality is deployed in the cloud provider(s) 140, a telemetry beacon 252 is also deployed. Routes, storage, and services implemented in the cloud provider(s) 140 can be configured to specify locations of the data centers, locations of users, routing, and policies. For example, a database may be instantiated for a tenant that requires data storage in the United States with a certain response time and unique IP addresses for sub-locations in Canada. By way of another example, a data center in Australia may have a sub-data center location in New Zealand so that localized content for New Zealand is available to users requesting content from New Zealand. This is possible using the unique IP address for the sub-data center location-New Zealand. Even after configuration, the telemetry beacon 252 will monitor compliance with the specified location, routing, and network traffic. The compliance telemetry is sent to the mid-link server 185. Through configuration or policy selection, enterprises 198 can configure which events are emitted as telemetry for reporting and alerting purposes. Updated configuration from the mid-link server 185 may mediate the non-compliance once uncovered. Telemetry gathering software and/or hardware can reside on the client device(s) 195, the mid-link server 185, and/or the cloud provider(s) 140 in different embodiments.

Figure 3:
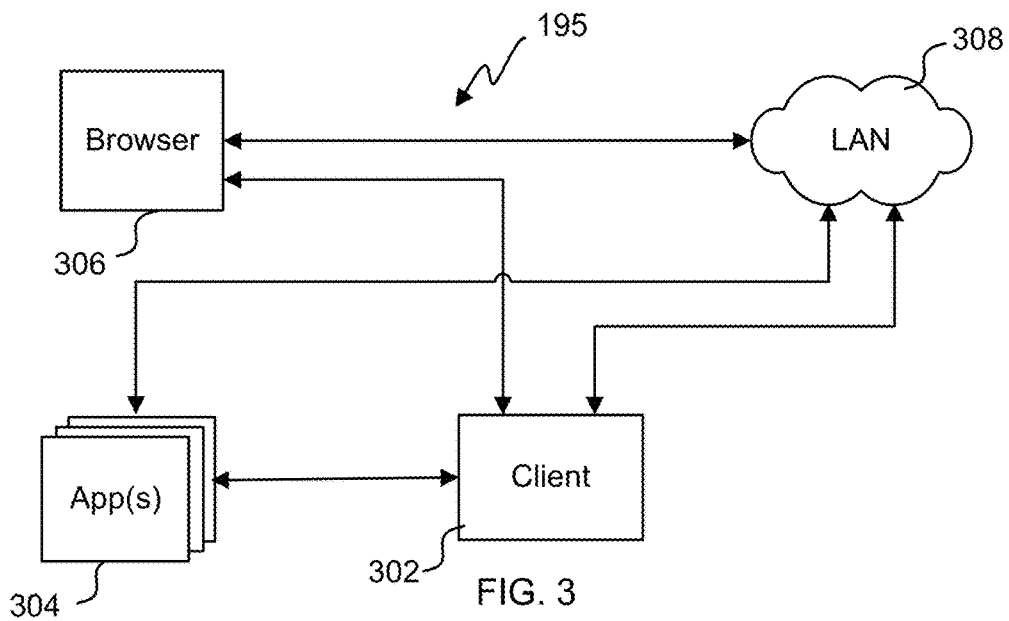
FIG. 3 depicts a block diagram of an embodiment of the client device that includes a client for enabling enhanced routing control.

Referring next to FIG. 3, a block diagram of an embodiment of the client device(s) 195 that includes a client 302 for enabling enhanced routing control is shown. The client device(s) 195 includes an application(s) app(s) 304 and browser(s) 306 that use the client 302 for communication over the LAN 308 and ultimately to the cloud provider(s) 140 (not shown). The browser 306 and the app(s) 304 can be redirected using domain name services (DNS) to use the client 302. Alternatively, the browser 306 and the app(s) 304 may natively support client 302 to utilize APIs or other communication to select policies and receive the corresponding routes.

Figure 4:
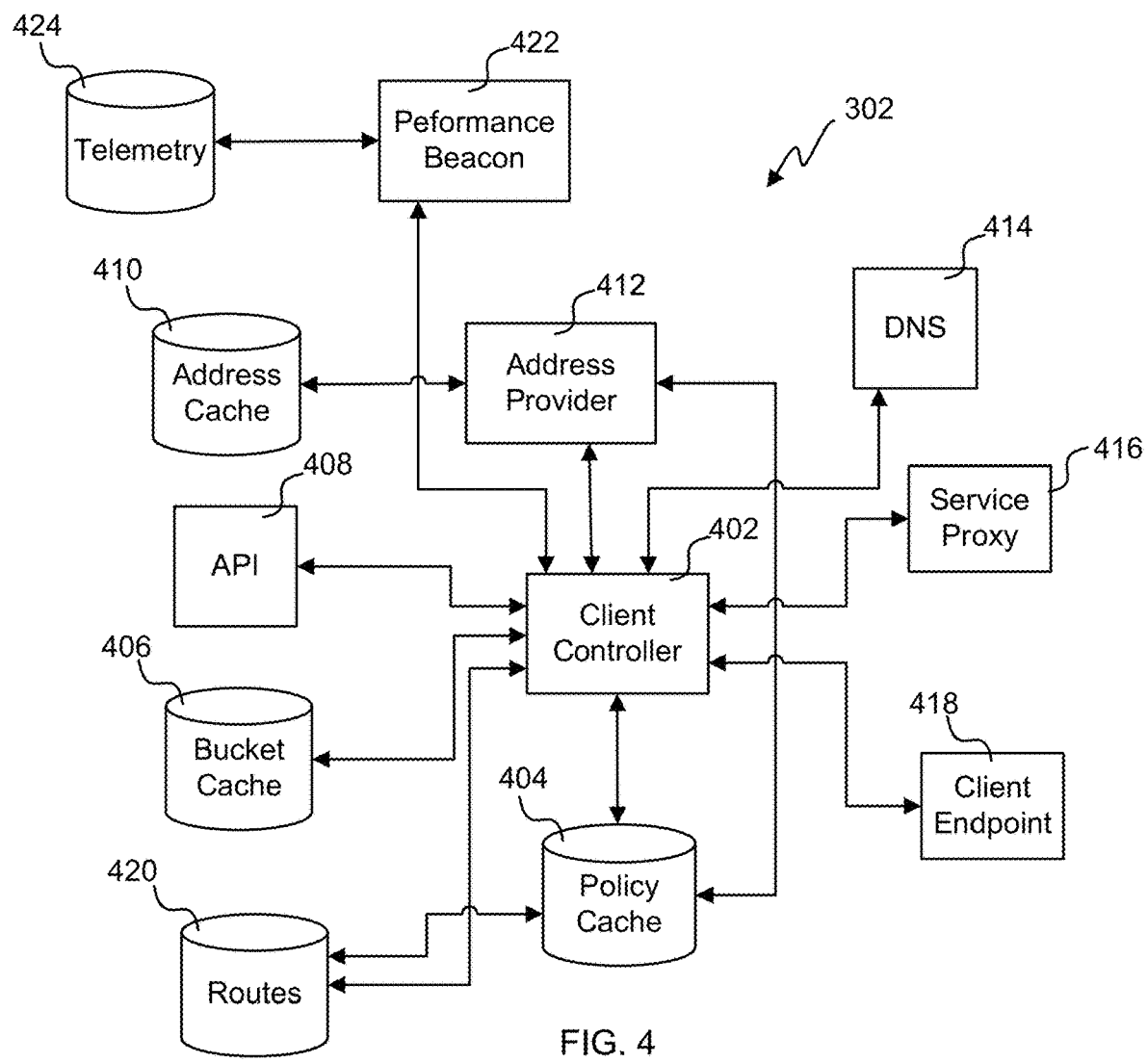
FIG. 4 depicts a block diagram of an embodiment of the client is shown that can specify by policy, IP addresses to be used for accessing cloud services under the management of a client controller.

Referring next to FIG. 4, a block diagram of an embodiment of the client 302 is shown that can specify by policy, IP addresses to be used for accessing the cloud services under the management of a client controller 402. The client controller 402 configures a Domain Name System (DNS) 414, fulfills Application Programming Interface (API) requests, and populates routes 420 and a policy cache 404. In operation, the client controller 402 configures data and service requests over the cloud network 100. The client 302 includes the client controller 402, the policy cache 404, a bucket cache 406, an API 408, an address cache 410, an address provider 412, the DNS 414, a service proxy 416, a client endpoint 418, the routes 420, a performance beacon 422, and a telemetry 424.

The client 302 can be specified for use with the DNS 414 which redirects traffic from the browsers 306 and the app(s) 304 to go through the client 302. Without changing any apps 304 or the browser 306, the client 302 can process traffic for the cloud network 100. The client 302 can operate as a proxy using the service proxy 416 or the VPN 190 using the client endpoint 418. The API 408 is provided for the apps 304 to configure the client 302 if they have that capability. The mid-link server 185 can also configure the client 302.

The mid-link server 185 sends relevant data center policies to the policy cache 404 to provide the functionality to the client 302. The policies allow specifying IP addresses for each user and IP addresses for data centers for client 302 to use. Table I gives examples of data center policies along with the data centers, specified routes, and their IP addresses.

TABLE I

Data center Policies

| Policy for data center | Routes | IP Address |
|---|---|---|
| USA including North America and South America | 185-1, 140-2 | IP Address 1, IP Address 4, IP Address 5 |
| | 185-1, 140-1, 140-2 | IP Address 2, P Address 8 |
| | 185-1, 185-2, 140-2 | IP Address 6 |
| | 185-3, 140-3 | IP Address 3, IP Address 9 |
| Australia including New Zealand UK including France, Germany, Spain | 185-4, 140-6 | IP Address 10, IP Address 11 |
| | 185-6, 140-5 | IP Address 12, IP Address 20, IP Address 19 |
| | 185-7, 140-2 | IP Address 12, IP Address 13 |
| | 185-1, 140-3-140-1 | IP Address 14, IP Address 15 |

Additionally, security checks needed as a condition of operation can be specified. For example, the policy can specify IP Address 1, IP Address 4, and IP Address 5 for requests from the US including North American and South American locations. Table II shows different policy examples along with the specified IP addresses. The routes are sent for the domain and enterprise 198 by the mid-link server 185 from its routes 420. The IP address is an IPV6 address or an IPv4 address.

TABLE II

Egress Policies

| User | IP Address | Policy |
| --- | --- | --- |
| User A | IP Address A | Web Applications, Emails, Searching Sites |
| User B | IP Address B | Web Applications, Emails |
| User C | IP Address C | Social Media Applications |
| User D | IP Address D | Emails, Desktop Applications |
| User E | IP Address E | Search Engines, Emails |

The performance beacon 422 monitors operation of the client 302 in compliance with specified policies to generate the telemetry 424. The telemetry 424 is periodically or upon request provided to the mid-link server 185 for processing. Where non-compliance with a policy is determined, unique IP addresses, policies, and configuration from the mid-link server 185 remediate the problem.

The policy cache 404 stores egress policies associated with the IP addresses of the users, their tenants, and the enterprises 198. The policy cache 404 further stores data center policies that are associated with IP addresses of the data centers located in various locations across the world. These policies are preset by the enterprises 198 and/or administrators of the enterprise 198. The policy cache 404 receives the IP addresses from the mid-link server 185.

The address cache 410 stores IP addresses to be allocated to the end user(s) 204. The address cache 410 further stores IP addresses for the nearest data centers to the user location also referred to as sub-data centers of the data centers located across the globe. The address cache 410 receives the IP addresses from the address provider 412. When a request is received from a location that does not have a data center, the request is routed to the nearest data center which has a unique IP address for local use. Each data center would have IP addresses for different locations such that the localized content would be delivered to traffic on the associated IP address for that location.

The address provider 412 provides the IP addresses to the client devices 195 and to the data centers from the IP addresses stored in the policy cache 404. The address provider 412 also stores the IP addresses in the address cache 410 for processing.

The bucket cache 406 stores information on bucketing of the end user(s) 204. When assigning IP addresses to each end user(s) 204 is not possible, then end user(s) 204 are grouped into buckets and further narrowed down such that each user is assigned the IP address. The buckets of the end user(s) 204 are received from the mid-link server 185 and stored in the bucket cache 406.

Figure 5:
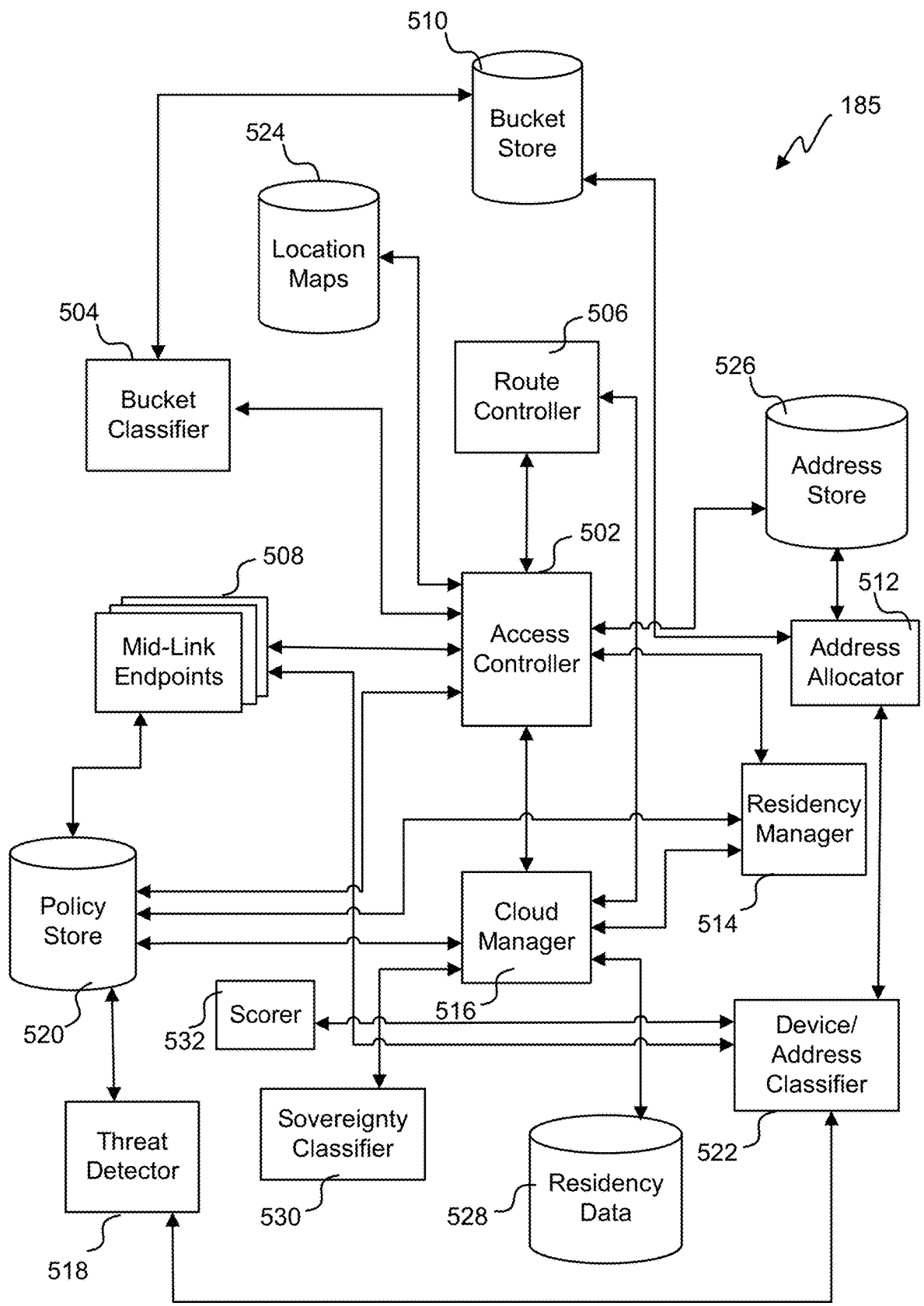
FIG. 5 illustrates a block diagram of an embodiment of a mid-link server.

Referring next to FIG. 5, a block diagram of an embodiment of the mid-link server 185 is shown. The mid-link server 185 includes an access controller 502, a bucket classifier 504, a route controller 506, mid-link endpoints 508, a bucket store 510, an address allocator 512, a residency manager 514, a cloud manager 516, a threat detector 518, a policy store 520, a device/address classifier 522, location maps 524, an address store 526, a residency data 528, a sovereignty classifier 530, and a scorer 532. Connections are made with the mid-link server 185 using the mid-link endpoints 508 to various client device(s) 195 and the cloud provider(s) 140. The policies in the policy store 520 are used to define how the cloud network 100 operates including various functions within the mid-link server 185, for example, what type of connections are allowed with the mid-link server 185. For example, the policies may require each end user device(s) 195 to have recently run anti-virus software and other security measures before allowing connection through the mid-link endpoint 508. An ingress tunnel between the client endpoint 418 and the mid-link endpoint 508 is used to by the client device(s) 195 to communicate with the mid-link server 185. The policies in the policy store 520 operate in the higher levels of the Open Systems Interconnection (OSI) model, such as the application layer to provide enhanced control. The identification of the policy and the assignment of the IP address is performed with the application layer. The policies in the policy store 520 include data center policies, egress policies, and tenant policies. The data center policies indicate IP addresses for the data centers and IP addresses for the sub-data centers that are used to provide content for their corresponding location. The egress policy indicates IP addresses for egressing users. The tenant policy allows, blocks, or partially allows access to specific applications on the client device(s) 195 using unique IP addresses.

The access controller 502 controls the functions of the mid-link server 185 including identifying the end user(s) 204, the client device(s) 195, and assigning an IP address to each end user(s) 204. The access controller 502 identifies locations of the incoming requests from the end user(s) 204 for content and if the data center is not available at their location, provides the content using the nearest data center (sub-data center).

The bucket classifier 504 permits the classification of the users into buckets. For example, when it is not possible to assign a unique IP address per user, the users can be identified by creating buckets and then narrowing down the buckets to assign one unique IP address per user. Once the buckets are created, a model can interpret the actions of the users and help identify suspicious users. The buckets of users that are created are stored in the bucket store 510 for storage and/or retrieval by the address allocator 512. A set of end user(s) 204 are categorized from the end user(s) 204 in a plurality of buckets. Each end user 204 from the set of user(s) 204 are assigned IP addresses based on the policies.

IP addresses having user requests from the end user(s) 204 can be classified as good IP addresses and bad IP addresses by the device/address classifier 522 based on compliance with the policies. The device/address classifier 522 receives the IP addresses of the client device(s) 195 of the end user(s) 204 from the address allocator 512. The address allocator 512 generates unique IP addresses for each end user(s) 204 of the client device(s) 195 based on the policies of the tenant and the applications being used or requested on the client device(s) 195. The client device(s) 195 includes a local application used to make a request for data also called a data request from the cloud provider(s) 140 via the mid-link server 185. For example, client device(s) 195 egressing while using emails are provided with a unique IP address. However, for web searches, unique IP addresses might not be allocated based on the policy. The address allocator 512 stores the allocated IP addresses in the address store 526 for storage and/or retrieval purposes.

Egress IPs are classified into 3 categories—Red, Yellow, and Green. IP addresses identified as risky or associated with suspicious activities are categorized as Red IPs. IP addresses identified as "on-premises" applications can be classified as Green Egress IPs while the IP address identified as "off-premises" applications can be classified as Yellow Egress IPs. Premises being the enterprise 198 of the end user(s) 204. A set of IP addresses of a set of end users 204 from the end users 204 are categorized as: a first set of IP addresses of a first set of end users 204 in a first category based on non-compliance with a security policy, a second set of IP addresses of a second set of end users 204 in a second category based on on-premises applications installed on the client devices 195 of the second set of end users 204, and a third set of IP addresses of a third set of end users 204 in a third category based on off-premises applications installed on the client devices 195 of the third set of end users 204. If the end user 204 is connecting from the on-premises network, the end user 204 is required to provide normal login credentials. But if the end user 204 is connecting from the off-premises network, two-factor authentication (2FA) is required. The set of IP addresses include the first set of IP addresses, the second set of IP addresses, and the third set of IP addresses, and the set of end users 204 include the first set of end users 204, the second set of end users 204, and the third set of end users 204.

The threat detector 518 performs user behavior analysis and identifies the user's browsing history and usage activities on the client device(s) 195 to identify suspicious activities of the end user(s) 204 based on non-compliance with the tenant policies. For example, requesting blocked sites, and installing applications with malware or viruses. The IP addresses of the suspicious end user(s) 204 that do not comply with the policies are classified as bad IP addresses. The IP addresses of the end user(s) 204 that comply with the policies are classified as good IP addresses. The suspicious IP addresses are sent to an administrator of the enterprise 198.

The scorer 532 uses machine learning algorithms to generate scores for the IP addresses based on the classification of the IP addresses by the threat detector 518 which is based on user behavior analysis. The scores are provided to different IP addresses to indicate whether the IP address is a good IP address or a bad IP address. The scores may be on a scale of 10-100 with 10 being the least indicating a threat from the activity of the end user(s) 204 of the least scored IP address. The administrator may assign additional tasks or challenges that can be presented to the end user(s) 204 classified with bad IP addresses. The buckets can be kept with enough users to assure privacy by mixing together their traffic.

The cloud manager 516 configures the various cloud provider(s) 140 (not shown) as per the data residency requirements of each tenant. To support the policies, the cloud manager 516 has scripts or routines with commands, configuration, and/or API calls that manage each cloud provider(s) 140 according to their unique interface to cause a compliant set of services and/or routes to be configured. The policies selected by the enterprise 198 and the client 302 communicate to the mid-link server 185 to control residency for the cloud services and routes. For example, a tenant may need a server instance with a database spun-up. Further, the tenant may specify by policy communicated to the mid-link server 185 that the data center of the cloud provider(s) 140 resides in Australia, but that the sub-data center is for New Zealand. The policy may further specify different IP addresses for each sub-data center. The policy may also dictate to the route controller 506, the location of the route from which requests have been received that could result in the cloud manager 516 performing additional configuration of the cloud provider(s) 140. The cloud manager 516 interprets the policies supported for each tenant and configures the cloud provider(s) 140 to support those services and the IP addresses according to the policies.

There are common concerns about where data will reside, be processed, and traverse while routed. For example, content data for the New Zealand location can be provided to the users from the data centers in the United States using the IP address for New Zealand. Some cloud provider(s) 140 allow specifying the IP addresses for the location-specific content data. It would not be unusual for a database in Canada to be backed up to resources in the United States. When deploying services, the residency manager 514 configures the cloud provider(s) 140 to specify residency or location for the sub-data centers. The residency data 528 is tracked and stored for all the services, routes, and data where the data center policy is specified. Embedded in the provisioning of a service is the telemetry 424 that monitors locations and other things like performance and routing. Similarly, client device(s) 195 reports telemetry on locations from around the world as observed from that perspective.

The sovereignty classifier 530 determines compliance with the policies with regard to the data centers and may gather its own telemetry from the cloud network 100. Those policies can specify in which country or countries and/or regions data is requested and routed. Telemetry from the mid-link server 185, the client device(s) 195, and the telemetry 424 in the cloud provider(s) 140 is gathered and stored in as the residency data 528. The telemetry and testing function to confirm the location of data centers, sub-data centers, storage, and routes can be performed anywhere in the cloud network 100. In some cases, two different nodes may test residency to confirm compliance, for example, both the mid-link server 185 and the client 302 could confirm the datalink between them conforms with a policy. Where non-compliance with the policy is detected, it is reported to the cloud manager 516 for remediation. In some cases, repeated violations are routed to a developer queue to work through the configuration settings for the cloud provider(s) 140 so that configuration can properly comply with the policy. Where there is a violation, another cloud provider(s) 140 that can be configured reliably is automatically switched over to until the problem is resolved.

The enterprises 198, the client device(s) 195, and the cloud provider(s) 140 are all interconnected with VPNs, leased lines, encrypted tunnels, etc. to communicate with the mid-link server 185 and each other at the link layer while keeping the domains for each tenant separate from each other.

Routing between various cloud services, enterprises 198 and the client device(s) 195 is arranged by the route controller 506. Different IP addresses for the users and the sub-data centers for content can be specified by the enterprise 198 according to the policy selected by a tenant.

The location maps 524 are maintained for paths between and within the cloud provider(s) 140, to/from enterprise locations, and to/from the mid-link server 185. The location maps 524 further maintain locations of data centers, sub-data centers, and users of all tenants.

Figure 6:
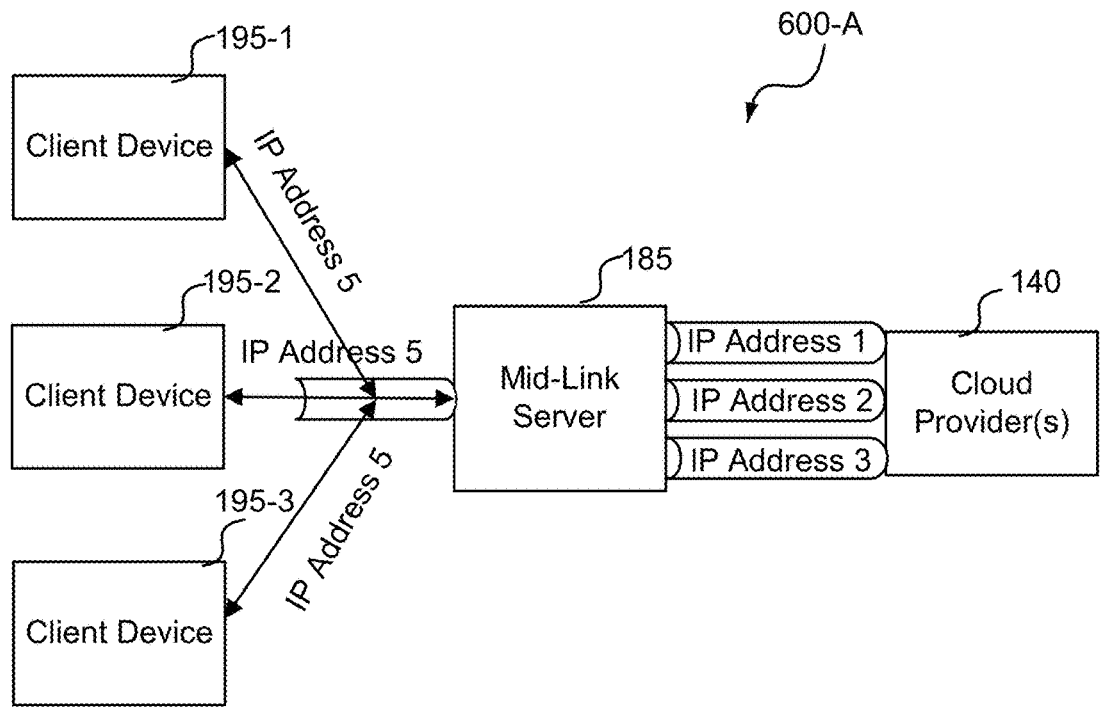
FIG. 6 illustrates flow diagrams 600-A and 600-B of communication between end users at client devices and the mid-link server for accessing content from the cloud providers.
Figure 6:
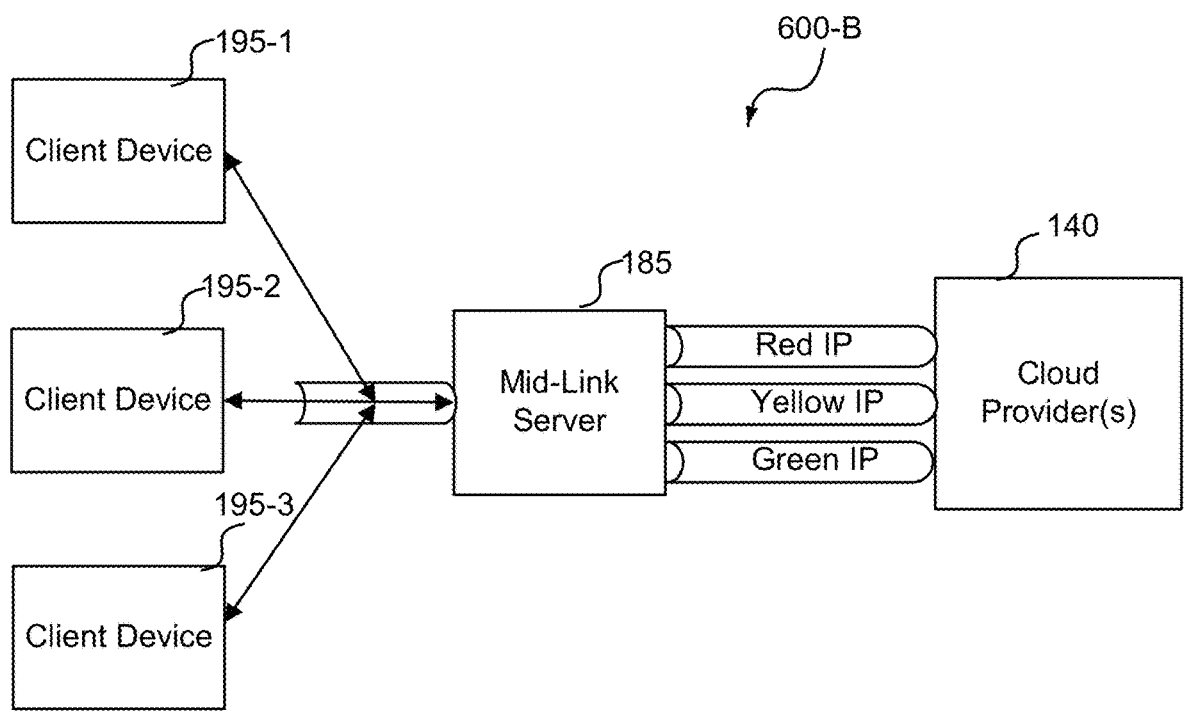

Referring next to FIG. 6, flow diagrams 600-A and 600-B of communication between the end user(s) 204 at the client device(s) 195-1, 195-2, 195-3, and the mid-link server 185 for accessing content from the cloud provider(s) 140 is shown. In flow diagram 600-A, each of the client device(s) 195-1, 195-2, 195-3 use their IP addresses (maybe same IP address 5) to request the cloud provider(s) 140 for access to third-party content. The client device(s) 195 uses ingress tunnels to connect with the mid-link server 185 and egress tunnels from the mid-link server 185 to the cloud provider(s) 140. A client device(s) 195 uses the ingress tunnel to connect with the mid-link server 185 and an egress tunnel to connect with the cloud provider(s) 140. The mid-link server 185 is configured to assign IP addresses (IP address 5) to the client device(s) 195 to ingress via ingress tunnels to the mid-link server 185 and further assigns IP addresses (IP address 1, IP address 2, and IP address 3) to egress via the egress tunnels to the cloud provider(s) 140. The online activities of each end user(s) 204 of the client device(s) 195 are tracked and monitored to identify any suspicious activities and their users.

In the flow diagram 600-B, each of the client device(s) 195-1, 195-2, 195-3 with their IP addresses (IP address 1, IP address 2, IP address 3) at the egress tunnels are classified into the categories of red, yellow and green IP addresses by the mid-link server 185. The classification of the IP addresses is based on non-compliance with tenant policies and suspicious activities of the users. The IP address identified as risky or associated with suspicious activities are categorized as Red IPs. IP addresses identified as "on-premises" apps can be classified as Green Egress IPs while the IP address identified as "off-premises" apps can be classified as Yellow Egress IPs. The cloud network 100 assigns IP addresses using machine learning algorithms and user behavior analysis based on usage of the app(s) 304. The cloud network 100 further identifies non-compliance of policies by the user using the IP address of the user, based on user's browsing activities.

The mid-link server 185 provides local content to the user or customer even if there is no data center presence of the enterprise 198 in that region. The mid-link server 185 makes content localization decision based on geolocation of the source IP. Users in country A can receive localized content even after the data center of the enterprise 198 fails over to counter B. Many SaaS applications provide conditional access based on source IP of users connecting to the app 304. For example, if user is connecting from on-premises network, user is required to provide normal login credentials, but if the user is connecting from off-premises network, 2FA is required.

The mid-link server 185 in flow diagram 600-B may need to distinguish if the user is connecting from risky country vs. non-risky country. Different egress IP ranges can be used to inform the app 304 about the country the user is connecting from. In the flow diagram 600-A, the customers or users can add their unique Ips to the allowlist of their SaaS/on-premises apps, thus blocking access to the app 304 from other users. Users can maintain the IP reputation of their IPs by not allowing IP sharing with other customers. The users can also use 3rd party vendors that have an allowlist of specific Ips that cannot be shared among other users.

In some cases, the user traffic egressing the enterprise 198 data center can be black holed i.e., silently dropped without informing the enterprise 198. Black holing can be done the application provider because of an issue with the source IP. In such cases, the network path of the user traffic egressing the enterprise 198 data center is optimized based on source routing policy.

Figure 7:
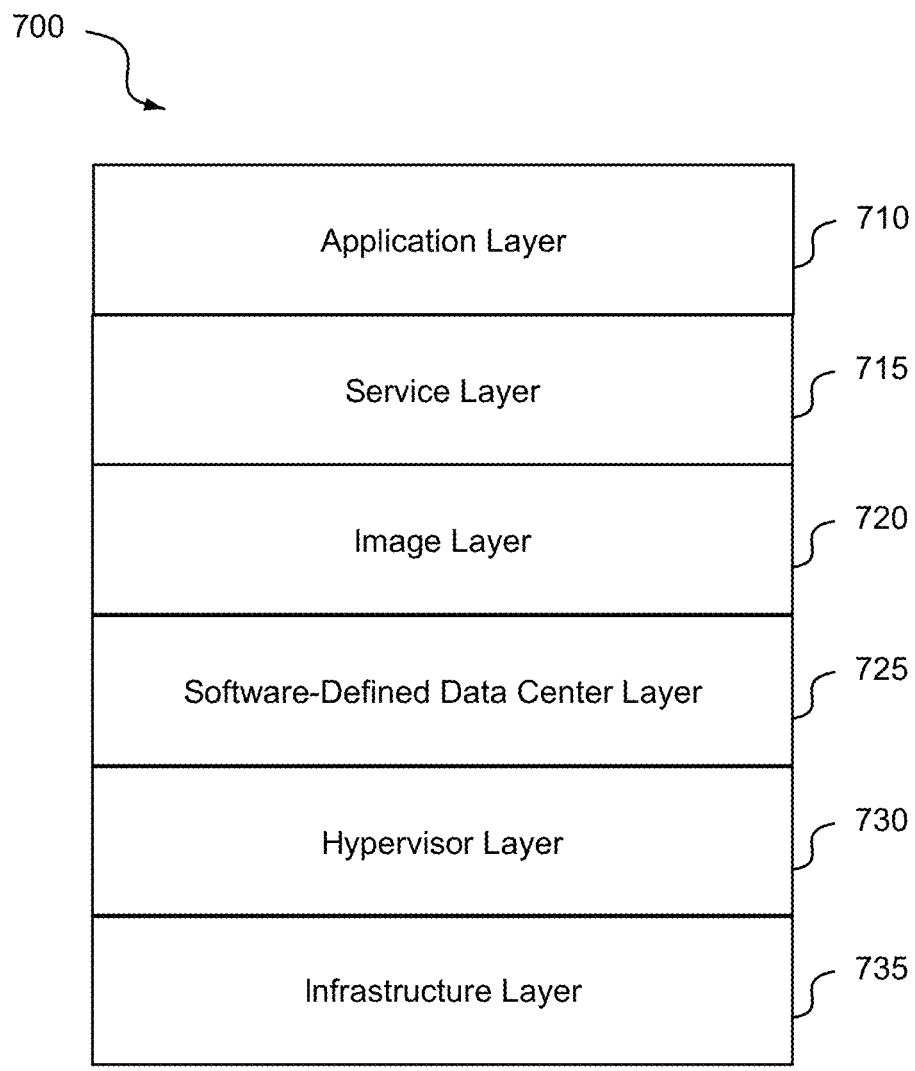
FIG. 7 illustrates a block diagram of an embodiment of a cloud OSI model for cloud computing environments.

Referring next to FIG. 7, a block diagram of an embodiment of a cloud OSI model 700 for cloud computing environments is shown. The cloud OSI model 700 for cloud computing environments partitions the flow of data in a communication system into six layers of abstraction. The cloud OSI model 700 for cloud computing environments may include, in order, an application layer 710, a service layer 715, an image layer 720, a software-defined data center layer 725, a hypervisor layer 730, and an infrastructure layer 735. Each layer serves a class of functionality to the layer above it and is served by the layer below it. Classes of functionality may be realized in software by various communication protocols.

The infrastructure layer 735 may include hardware, such as physical devices in a data center, that provides the foundation for the rest of the layers. The infrastructure layer 735 may transmit and receive unstructured raw data between a device and a physical transmission medium. For example, the infrastructure layer 735 may convert the digital bits into electrical, radio, or optical signals.

The hypervisor layer 730 may perform virtualization, which may allow the physical devices to be divided into virtual machines that can be bin packed onto physical machines for greater efficiency. The hypervisor layer 730 may provide virtualized computing, storage, and networking. For example, OpenStack® software that is installed on bare metal servers in a data center may provide virtualization cloud capabilities. The OpenStack® software may provide various infrastructure management capabilities to cloud operators and administrators and may utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 725 may provide resource pooling, usage tracking, and governance on top of the hypervisor layer 730. The software-defined data center layer 725 may enable the creation virtualization for the Infrastructure-as-Code concept by using representational state transfer (REST) APIs. The management of block storage devices may be virtualized, and end users may be provided with a self-service API to request and consume those resources without requiring any knowledge of where the storage is actually deployed or on what type of device. Various computing nodes may be balanced for storage.

The image layer 720 may use various operating systems and other pre-installed software components. Patch management may be used to identify, acquire, install, and verify patches for products and systems. Patches may be used to correct security and functionality problems in software. Patches may also be used to add new features to operating systems, including security capabilities. The image layer 720 may focus on the computing instead of storage and networking. The instances within the cloud computing environments may be provided at the image layer 720.

The service layer 715 may provide middleware, such as functional components that applications use in tiers. In some examples, the middleware components may include databases, load balancers, web servers, message queues, email services, or other notification methods. The middleware components may be defined at the service layer 715 on top of particular images from the image layer 720. Different cloud computing environment providers may have different middleware components.

The application layer 710 may interact with software applications that implement a communicating component. The application layer 710 is the layer that is closest to the end user. Functions of the application layer 710 may include identifying communication partners, determining resource availability, and synchronizing communication. Applications within the application layer 710 may include custom code that makes use of middleware defined in the service layer 715.

Various features discussed above may be performed at one or more layers of the cloud OSI model 700 for cloud computing environments. For example, translating the general policies into specific policies for different cloud computing environments may be performed at the service layer 715 and the software-defined data center layer 725. Various scripts may be updated across the service layer 715, the image layer 720, and the software-defined data center layer 725. Further, APIs and policies may operate at the software-defined data center layer 725 and the hypervisor layer 730.

Each of the different cloud computing environments may have different service layers 715, image layers 720, software-defined data center layers 725, hypervisor layers 730, and infrastructure layers 735. Further, each of the different cloud computing environments may have an application layer 710 that can make calls to the specific policies in the service layer 715 and the software-defined data center layer 725. The application layer 710 may have substantially the same format and operation for each of the different cloud computing environments. Accordingly, developers for the application layer 710 may not need to understand the peculiarities of how each of the cloud computing environments operates in the other layers.

Figure 8:
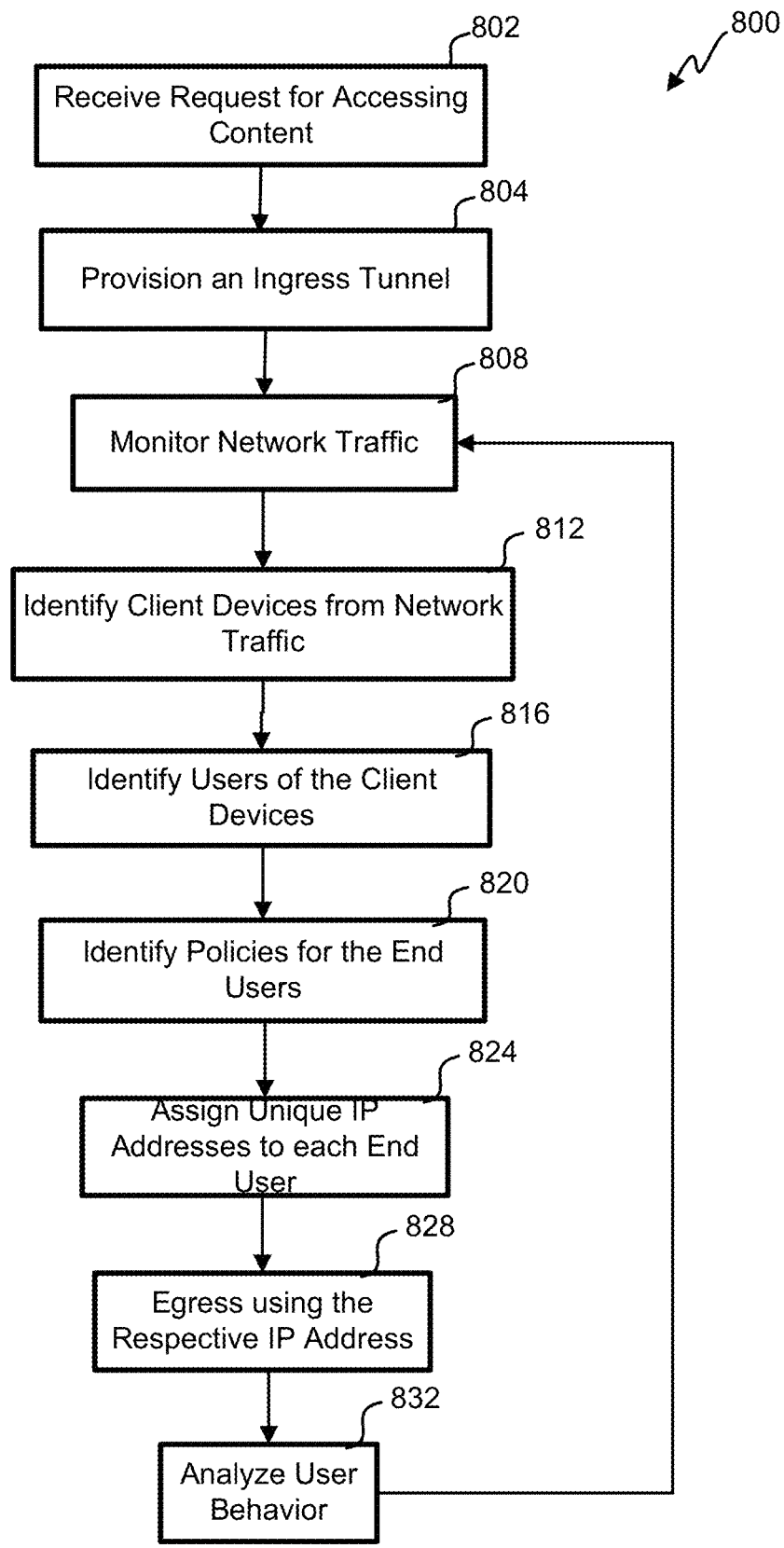
FIG. 8 illustrates a flowchart of an embodiment of an IP address assignment process for assigning unique IP addresses to users of client devices.

Referring next to FIG. 8, a flowchart of an embodiment of an IP address assignment process 800 for assigning unique IP addresses to the users of the client device(s) 195 is shown. The depicted portion of the process begins at block 802 where an end user(s) 204 of the client device(s) 195 requests for accessing content from the cloud provider(s) 140 via the mid-link server 185. At block 804, the ingress tunnels are provisioned for the client device(s) 195 to communicate with the mid-link server 185. IP addresses are used by the client device(s) 195 to connect with the mid-link server 185. The end user(s) 204 is interested in accessing data from the content. The content may be from a website, web or mobile application, streaming content sites, software, applet, downloading, browsing, or installing an application.

The mid-link server 185 acts as an intermediate server controlling access to the content at a middle mile based on a set of policies. The cloud provider(s) 140 provides the data associated with the content to the end user(s) 204 at the last mile based on the authorization of the content at the mid-link server 185.

At block 808, the mid-link server 185 monitors the network traffic from the client device(s) 195. The incoming requests for accessing the content are received from the client device(s) 195 at the mid-link server 185.

At block 812, the client device(s) 195 are identified from the network traffic. The client device(s) 195 and their corresponding requests are identified to differentiate the various client device(s) 195.

At block 816, users of the client device(s) 195 are identified from the client devices 195. The policies associated with the end user(s) 204 are identified at block 820. The policies include tenant policy, data center policy, and egress policy. The tenant policy includes policies set by the tenant of the end user(s) 204 and/or the enterprise 198 of the end user(s) 204. The data center policy is associated with the data center to be used corresponding to the location of the request of the end user(s) 204. The egress policy includes assigning unique IP addresses to each end user(s) 204 egressing the mid-link server 185. The egress policy is set based on the type of application being used and/or requested by the end user(s) 204 at the client device(s) 195 for example, emails may need unique IP addresses however, a desktop application might not need a separate IP address and may work with the common IP address for all client device(s) 195.

At block 824, according to the egress policy, each client device(s) 195 is assigned a unique IP address that is different from each other. The assignment of the unique IP addresses to each client device(s) 195 helps to track the user activities associated with the client device(s) 195.

At block 828, the client device(s) 195 use their unique IP addresses to egress through the egress tunnels from the mid-link server 185 to the cloud provider(s) 140 for accessing the content.

At block 830, user behavior is analyzed from the user activities by tracking the user's browsing activities using the IP addresses of the client device(s) 195. User behavior analysis includes identifying suspicious behavior from the end user(s) 204. The user behavior analysis is alerted to the administrator of the enterprise of the end user(s) 204. The suspicious user is identified using the respective IP address of the client device(s) 195 of the end user(s) 204. The administrator and/or the enterprise 198 may apply a remediation based on the policy to the client device(s) 195 of the suspicious user and notify the end user(s) 204 of the client device(s) 195 of the remediation by displaying on the client device(s) 195.

Figure 9:
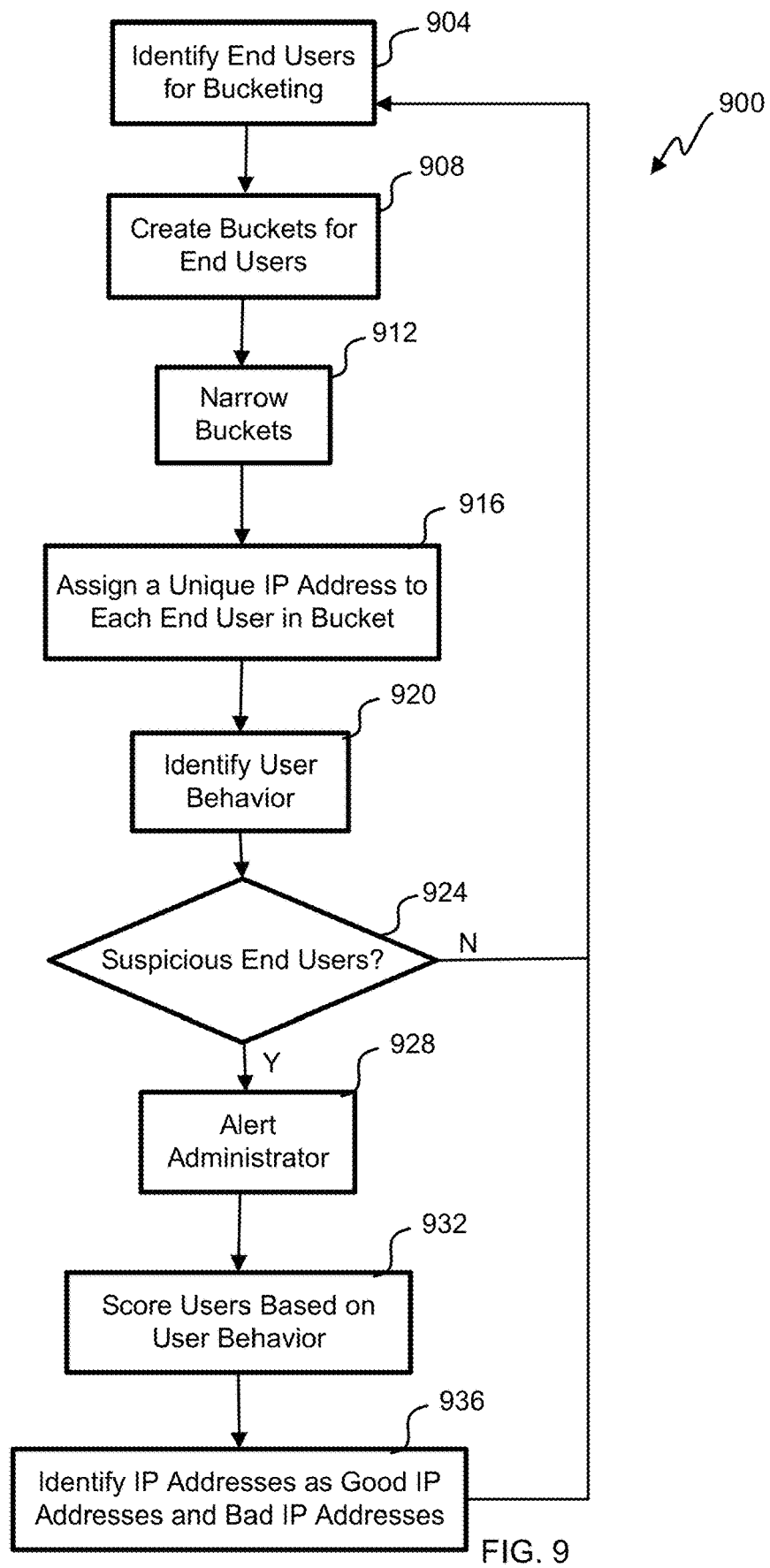
FIG. 9 illustrates a flowchart of an embodiment of a bucket creation process at the mid-link server to group users of client devices.

Referring next to FIG. 9, a flowchart of an embodiment of a bucket creation process 900 at the mid-link server 185 to group the end user(s) 204 of the client device(s) 195 is shown. The depicted portion of the process begins at block 904 where the end user(s) 204 of the client device(s) 195 are identified for creating groups of users also called buckets of users. When it is not possible to assign IP addresses to each end user(s) 204 according to the egress policies, the end user(s) 204 are grouped into buckets.

At block 908, the buckets of users are created which is a group of users. Each bucket of the user is assigned an IP address.

At block 912, the buckets are narrowed down. For example, there are 50 users in the bucket and the bucket is assigned an IP address 1. The bucket is narrowed down to 25 users and the two buckets created will be assigned IP address 2, and IP address 3. The buckets are narrowed down till each user is assigned a unique IP address.

At block 916, the bucket has been narrowed down such that each end user(s) 204 is assigned a unique IP address by the mid-link server 185.

At block 920, the threat detector 518 of the mid-link server 185 analyzes the user behavior using the IP address of each end user(s) 204. At block 924, the threat detector 518 of the mid-link server 185 checks if there are any suspicious end user(s) of the client device(s) 195. If there are no suspicious end user(s), then the mid-link server 185 starts over from block 904.

At block 928, if the threat detector 518 identifies any suspicious activity from the user's browsing activities, an administrator of the enterprise is alerted. Non-compliance with the tenant policy, for example, malicious, malware, virus, or fraud is identified as suspicious activity.

At block 932, end user(s) 204 and the IP addresses of their client device(s) 195 are scored based on the user behavior by the scorer 532 of the mid-link server 185. The scores may be numerical values indicating a possible threat attached to the IP addresses.

At block 936, the IP addresses of the client device(s) 195 are identified as good IP addresses or bad IP addresses based on compliance with the tenant policies. The mid-link server 185 provides the identified good and bad IP addresses to the client device(s) 195 and may alert the user of the client device(s) 195.

Figure 10:
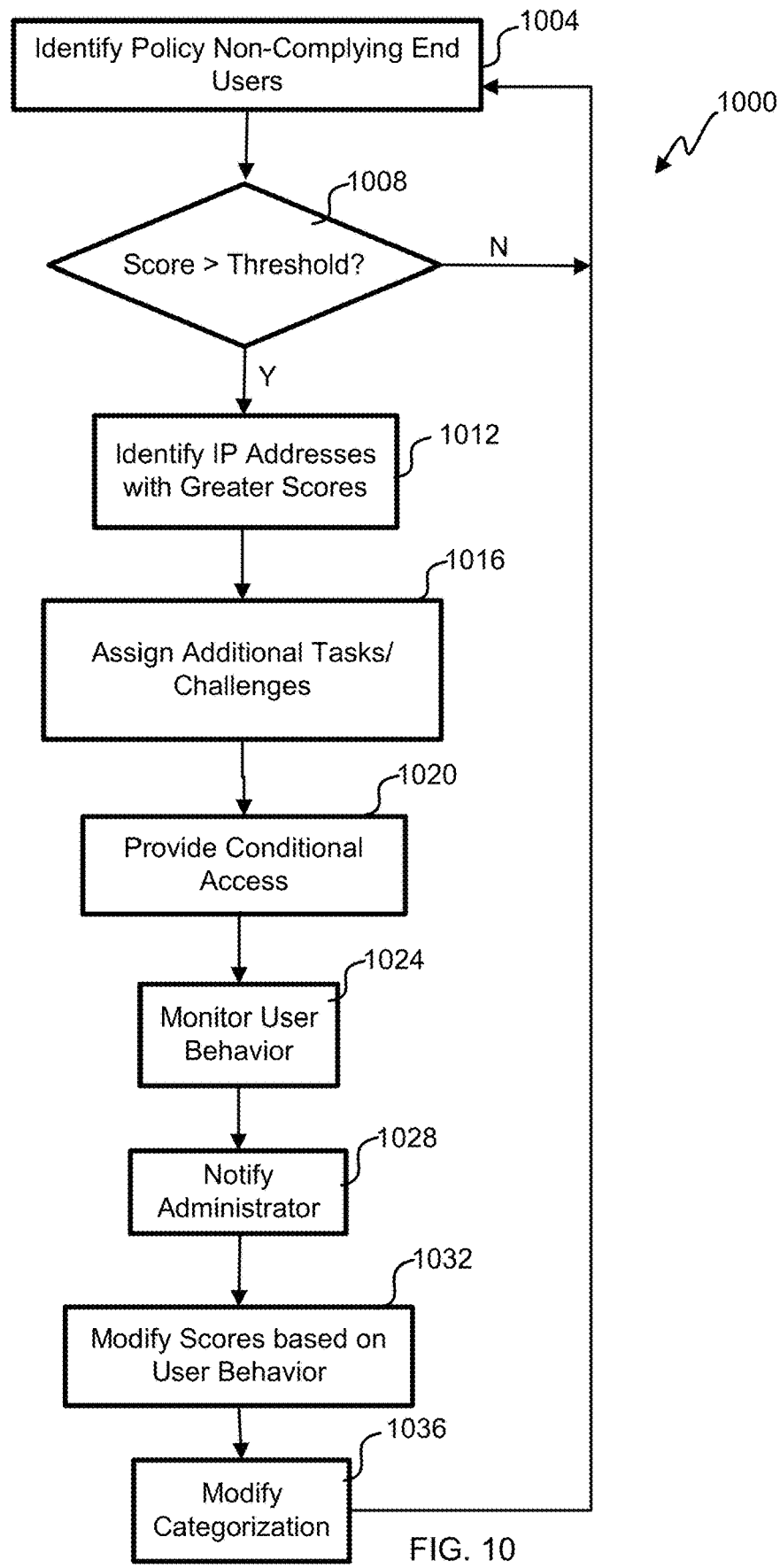
FIG. 10 illustrates a flowchart of an embodiment of a policy non-compliance process for determining non-compliance of policies by end users of client devices.

Referring next to FIG. 10, a flowchart of an embodiment of a policy non-compliance process 1000 for determining non-compliance of policies by the end user(s) 204 of the client device(s) 195 is shown. The depicted portion of the process begins at block 1004 where the threat detector 518 of the mid-link server 185 identifies one or more end user(s)

204 not complying with the policies (including the tenant policy). The end user(s) 204 has requested the content from a cloud provider(s) 140 which goes through the mid-link server 185 for policy application. Client device(s) 195 of the end user(s) 204 are assigned unique IP addresses as per the tenant policy. The scorer 532 determines scores for the IP addresses corresponding to the client device(s) 195 of the end user(s) 204 not complying with the policies. The IP address is an IPV6 address or an Ipv4 address.

At block 1008, each of the scores determined is compared to a threshold value preset by an administrator and/or the enterprise 198 of the end user(s) 204. The scores that are greater than the threshold value are determined. The values of the scores above the threshold value are considered a bigger threat than the values of the scores below the threshold value. The scores of the IP addresses above the threshold value that are the bigger threat need immediate action from the administrator, for example, remediation.

The process further proceeds to block 1012, where the IP addresses of the client device(s) 195 with scores greater than the threshold value are identified. The IP addresses are provided to the administrator to take action.

At block 1016, additional tasks and/or challenges are presented to the end user(s) 204 of the client device(s) 195 with greater scores than the threshold value by the administrator. The additional tasks and/or challenges make it difficult for the end user(s) 204 to access the content being requested.

At block 1020, conditional access is provided for example, partial access to content for a time period or partial access to specific content, or the content is blocked or permitted based on the tenant policy.

At block 1024, user activities including browsing activities are monitored using the unique IP addresses of the client device(s) 195 to identify suspicious activities of the end user(s) 204.

At block 1028, an administrator is notified of the user activities so that the administrator may take action against any suspicious activity of the end user(s) 204. The real-time user activities identified by the threat detector 518 of the mid-link server 185 are provided to the administrator.

At block 1032, scorer 532, modifies the scores of the IP addresses based on real-time user activities. The scores change based on the user's browsing activities or desktop activities.

At block 1036, based on the modified scores of the IP addresses, the device/address classifier 522 modifies the categorization of the IP addresses of the client device(s) 195 of the end user(s) 204 as good IP addresses or bad IP addresses. For example, an IP address of a client device(s) 195 which was previously categorized as a good IP address may be changed to a bad IP address.

Figure 11:
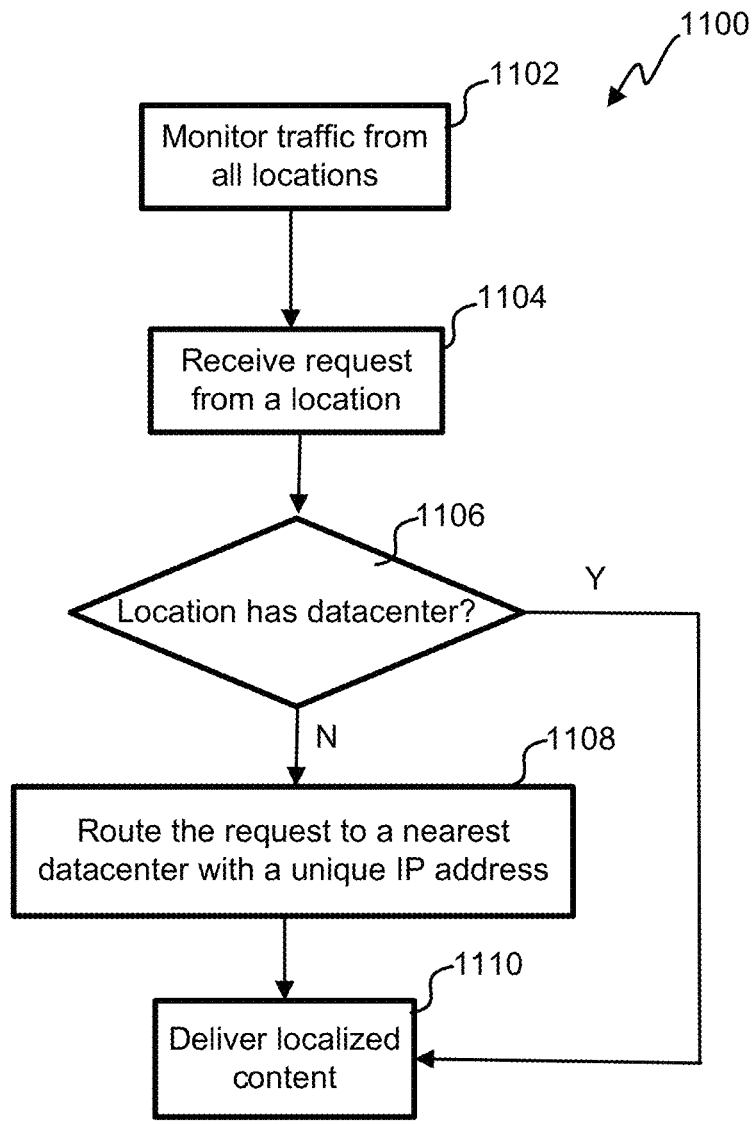
FIG. 11 illustrates a flowchart of an embodiment of a localized content delivery process based on data center's IP address.

Referring next to FIG. 11, a flowchart of an embodiment of a localized content delivery process 1100 based on the data center's IP address is shown. The depicted portion of the process begins at block 1102 where the mid-link server 185 monitors the network traffic from all locations of the world.

At block 1104, requests for local data or local content are received from one or more end user(s) 204 of the client device(s) 195. The local content is requested to the cloud provider(s) 140 via the mid-link server 185.

At block 1106, the location of the requests is identified which is further used to identify the data centers facilitating the delivery of the local content in the location of the requests. A determination is made whether the location of the request or the user location has a data center. If the location of the request has the data center, then at block 1110, the localized content is delivered to the end user(s) 204 via the data center.

At block 1108, if the user location does not have a data center, the request is routed to the nearest data center to the user location called a sub-data center which has a unique IP address for the user location in order to deliver the localized content. For example, Australia will have a sub-data center for New Zealand to deliver localized content for New Zealand.

At block 1110, the localized content is delivered to the end user(s) 204 via the sub-data center.

Figure 12:
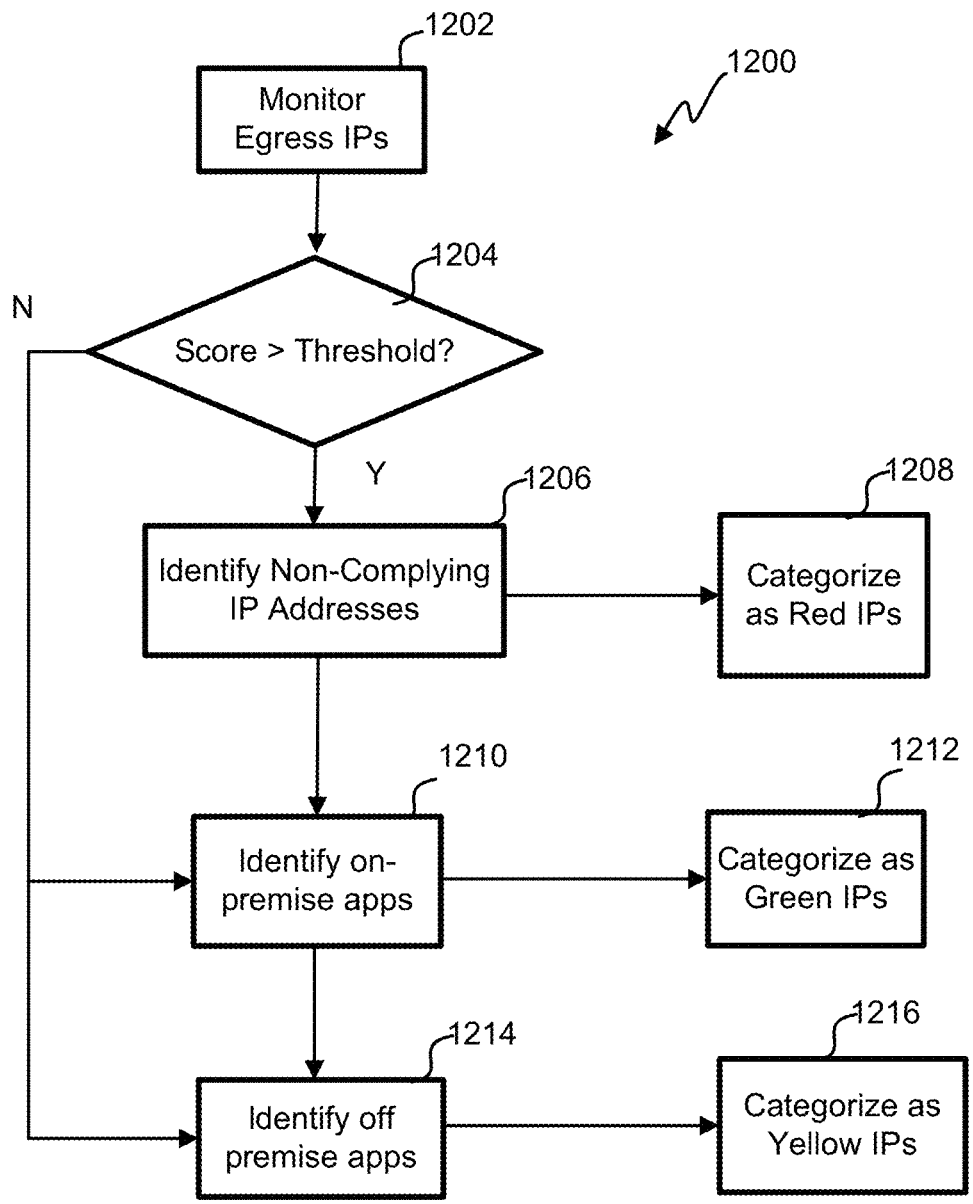
FIG. 12 illustrates a flowchart of an embodiment of an IP address categorization process of IP addresses of end users.

Referring next to FIG. 12, a flowchart of an embodiment of an IP address categorization process 1200 of the IP addresses of the end user(s) 204 is shown. The depicted portion of the process begins at block 1202 where the mid-link server 185 monitors the network traffic from the client device(s) 195 and their egress IP addresses (IP addresses egressing from the mid-link server 185 to the cloud provider(s) 140).

At block 1204, the scores of the egress IP addresses assigned by the scorer 532 are compared to the threshold value. If the scores of the egress IP addresses are greater than the threshold value, then at block 1206, the egress IP addresses are identified as non-complying IP addresses as they do not comply with the tenant policy of client device security. At block 1208, the non-complying IP address is classified by the device/address classifier 522 as red IP addresses.

At block 1210, on-premises applications on each of the client device(s) 195 of the egress IP addresses are identified. If the on-premises applications are identified on one or more of the client device(s) 195, the corresponding egress IP addresses are categorized as green IP addresses at block 1212.

At block 1214, off-premises applications on each of the client device(s) 195 of the egress IP addresses are identified. If the off-premises applications are identified on one or more of the client device(s) 195, the corresponding egress IP addresses are categorized as yellow IP addresses at block 1216.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMS, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

We claim:

1. A cloud network for delivering local content to a user of a plurality of users at a user location, the cloud network comprising:
a client device comprising a local application, the local application runs on the client device;
a mid-link server configured to:
receive from the local application on the client device, a request for local data from the user at the user location from a plurality of locations;
identify a set of locations from the plurality of locations without data centers, wherein the user has provided the request for the local data from the user location without a data center, and the user location is from the set of locations;
categorize a sub-data center for the user location from a plurality of data centers, wherein the sub-data center is assigned an Internet Protocol (IP) address for the user location, and the sub-data center is a data center nearest to the user location which is assigned the IP address for the user location;
route the request to the sub-data center, wherein each data center of the plurality of data centers have IP addresses for different locations to deliver the local content on the respective IP address for the location; and
provide the user at the user location, the local data using the IP address of the sub-data center; and
a cloud provider configured to provide the local data to the user based on the request for the local data from the user.

2. The cloud network for delivering local content to a user of a plurality of users at a user location as recited in claim 1, wherein the mid-link server is further configured to:
categorize a set of IP addresses of a set of users from the plurality of users;
categorize a first set of IP addresses of a first set of users in a first category based on non-compliance with a security policy;
categorize a second set of IP addresses of a second set of users in a second category based on on-premises applications installed on client devices of the second set of users; and
categorize a third set of IP addresses of a third set of users in a third category based on off-premises applications installed on client devices of the third set of users, wherein the set of IP addresses include the first set of IP addresses, the second set of IP addresses, and the third set of IP addresses, and the set of users include the first set of users, the second set of users, and the third set of users.

3. The cloud network for delivering local content to a user of a plurality of users at a user location as recited in claim 1, wherein the IP address is an Ipv6 address or an Ipv4 address.

4. The cloud network for delivering local content to a user of a plurality of users at a user location as recited in claim 1, wherein data center policies are associated with IP addresses of the plurality of data centers.

5. The cloud network for delivering local content to a user of a plurality of users at a user location as recited in claim 1, wherein the local data is provided to the user using the data center of the user location if the user location has the data center.

6. The cloud network for delivering local content to a user of a plurality of users at a user location as recited in claim 4, wherein the plurality of data centers are located across the world.

7. The cloud network for delivering local content to a user of a plurality of users at a user location as recited in claim 1, wherein the assignment of the IP address is performed with an application layer.

8. A localized content providing method in a cloud-based multi-tenant system for delivering local content to a plurality of users at a specific location, the localized content providing method comprising:
receiving from a local application on a client device, a request for local data from a user of the plurality of users at a user location from a plurality of locations;
identifying by a mid-link server, a set of locations from the plurality of locations without data centers, wherein the user has provided the request for the local data from the user location without a data center, and the user location is from the set of locations;
categorizing a sub-data center for the user location from a plurality of data centers, wherein the sub-data center is assigned an Internet Protocol (IP) address for the user location, and the sub-data center is a data center nearest to the user location which is assigned the IP address for the user location;
routing the request to the sub-data center, wherein each data center of the plurality of data centers have IP addresses for different locations to deliver the local content on the respective IP address for the location; and
providing the user at the user location, the local data using the IP address of the sub-data center.

9. The localized content providing method in a cloud-based multi-tenant system for delivering local content to a plurality of users at a specific location as recited in claim 8, further comprising:
categorizing a set of IP addresses of a set of users from the plurality of users;
categorizing a first set of IP addresses of a first set of users in a first category based on non-compliance with a security policy;
categorizing a second set of IP addresses of a second set of users in a second category based on on-premises applications installed on client devices of the second set of users; and
categorizing a third set of IP addresses of a third set of users in a third category based on off-premises applications installed on client devices of the third set of users, wherein the set of IP addresses include the first set of IP addresses, the second set of IP addresses, and the third set of IP addresses, and the set of users include the first set of users, the second set of users, and the third set of users.

10. The localized content providing method in a cloud-based multi-tenant system for delivering local content to a plurality of users at a specific location as recited in claim 8, wherein the IP address is an IPV6 address or an IPV4 address.

11. The localized content providing method in a cloud-based multi-tenant system for delivering local content to a plurality of users at a specific location as recited in claim 8, wherein data center policies are associated with IP addresses of the plurality of data centers.

12. The localized content providing method in a cloud-based multi-tenant system for delivering local content to a plurality of users at a specific location as recited in claim 8, wherein the local data is provided to the user using the data center of the user location if the user location has the data center.

13. The localized content providing method in a cloud-based multi-tenant system for delivering local content to a plurality of users at a specific location as recited in claim 8, wherein the plurality of data centers are located across the world.

14. A localized content providing method in a cloud-based multi-tenant system for delivering local content to a plurality of users at a specific location, collectively having code for:
   receiving from a local application on a client device, a request for local data from a user of the plurality of users at a user location from a plurality of locations;
   identifying by a mid-link server, a set of locations from the plurality of locations without data centers, wherein the user has provided the request for the local data from the user location without a data center, and the user location is from the set of locations;
   categorizing a sub-data center for the user location from a plurality of data centers, wherein the sub-data center is assigned an Internet Protocol (IP) address for the user location, and the sub-data center is a data center nearest to the user location which is assigned the IP address for the user location;
   routing the request to the sub-data center, wherein each data center of the plurality of data centers have IP addresses for different locations to deliver the local content on the respective IP address for the location; and
   providing the user at the user location, the local data using the IP address of the sub-data center.

15. The localized content providing method in a cloud-based multi-tenant system for delivering local content to a plurality of users at a specific location as recited in claim 14, further comprising:
   categorizing a set of IP addresses of a set of users from the plurality of users;
   categorizing a first set of IP addresses of a first set of users in a first category based on non-compliance with a security policy;
   categorizing a second set of IP addresses of a second set of users in a second category based on on-premises applications installed on client devices of the second set of users; and
   categorizing a third set of IP addresses of a third set of users in a third category based on off-premises applications installed on client devices of the third set of users, wherein the set of IP addresses include the first set of IP addresses, the second set of IP addresses, and the third set of IP addresses, and the set of users include the first set of users, the second set of users, and the third set of users.

16. The localized content providing method in a cloud-based multi-tenant system for delivering local content to a plurality of users at a specific location as recited in claim 14, wherein the IP address is an IPV6 address or an IPV4 address.

17. The localized content providing method in a cloud-based multi-tenant system for delivering local content to a plurality of users at a specific location as recited in claim 14, wherein data center policies are associated with IP addresses of the plurality of data centers.

18. The localized content providing method in a cloud-based multi-tenant system for delivering local content to a plurality of users at a specific location as recited in claim 14, wherein the plurality of data centers are located across the world.

19. The localized content providing method in a cloud-based multi-tenant system for delivering local content to a plurality of users at a specific location as recited in claim 14, wherein the local data is provided to the user using the data center of the user location if the user location has the data center.

20. The localized content providing method in a cloud-based multi-tenant system for delivering local content to a plurality of users at a specific location as recited in claim 14, wherein the assignment of the IP address is performed with an application layer.

* * * * *